(12) United States Patent
Xu et al.

(10) Patent No.: US 8,675,768 B2
(45) Date of Patent: *Mar. 18, 2014

(54) UNIFIED DESIGN AND CENTRALIZED SCHEDULING FOR DYNAMIC SIMO, SU-MIMO AND MU-MIMO OPERATION FOR RL TRANSMISSIONS

(71) Applicant: QUALCOMM Incorporated, San Diego, CA (US)

(72) Inventors: Hao Xu, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,461

(22) Filed: Jun. 13, 2013

(65) Prior Publication Data
US 2013/0279617 A1    Oct. 24, 2013

Related U.S. Application Data

(63) Continuation of application No. 12/443,796, filed as application No. PCT/US2007/083057 on Oct. 30, 2007.

(60) Provisional application No. 60/863,793, filed on Oct. 31, 2006.

(51) Int. Cl.
*H04B 7/02* (2006.01)

(52) U.S. Cl.
USPC ............................................ 375/267; 375/299

(58) Field of Classification Search
USPC .................................. 375/260, 267, 295, 299
See application file for complete search history.

(56) References Cited

U.S. PATENT DOCUMENTS 6,563,810 B1 * 5/2003 Corazza ........................ 370/335
6,751,187 B2    6/2004 Walton et al.
(Continued)

FOREIGN PATENT DOCUMENTS

GB    2421664 A    6/2006
JP    2008533827    8/2008
(Continued)

OTHER PUBLICATIONS

International Search Report—PCT/US07/083057—International Search Authority, European Patent Office—Sep. 11, 2008.

(Continued)

*Primary Examiner* — David B. Lugo
(74) *Attorney, Agent, or Firm* — Kenyon S. Jenckes

(57) ABSTRACT

Systems and methods facilitate pilot signal design, power control, data rate determination, and channel assignment in the reverse link of a wireless communication system for dynamic scheduling and joint operation in SIMO, SU-MIMO, and MU-MIMO. Pilot signal is based on periodic transmissions of multiple sounding reference sequences for channel estimation. Power control is based on a reference signal at a predetermined power spectral density (PSD) level, and on an offset PSD determined and signaled based on an antenna that transmits the reference signal, other cell interference, and power amplifier headroom. PSD levels for SIMO/MIMO data transmissions are determined based on channel estimates and the predetermined PSD and offset PSD. Such data PSD levels are employed to generate data rates, and to dynamically schedule data streams for communication. Communication resources are conveyed through a channel assignment with an overhead that depends on the maximum multiplexing order of the estimated channel.

16 Claims, 12 Drawing Sheets

(56) References Cited

U.S. PATENT DOCUMENTS

| | | | |
|---|---|---|---|
| 7,058,367 B1 | 6/2006 | Luo et al. | |
| 7,466,969 B2 | 12/2008 | Kimata et al. | |
| 7,515,927 B2 | 4/2009 | Das et al. | |
| 7,652,527 B2 | 1/2010 | Ido et al. | |
| 7,809,336 B2 | 10/2010 | Naguib et al. | |
| 2003/0125002 A1 | 7/2003 | Harrison | |
| 2004/0082356 A1 | 4/2004 | Walton et al. | |
| 2005/0099939 A1 | 5/2005 | Huh et al. | |
| 2005/0213714 A1 | 9/2005 | Langberg et al. | |
| 2005/0245280 A1 | 11/2005 | Liu et al. | |
| 2006/0109923 A1 | 5/2006 | Cai et al. | |
| 2006/0121946 A1 | 6/2006 | Walton et al. | |
| 2007/0004465 A1 | 1/2007 | Papasakellariou et al. | |
| 2007/0270175 A1* | 11/2007 | Malladi et al. | 455/522 |
| 2008/0045260 A1 | 2/2008 | Muharemovic et al. | |
| 2010/0173665 A1* | 7/2010 | Michel et al. | 455/522 |
| 2010/0296591 A1* | 11/2010 | Xu et al. | 375/259 |

FOREIGN PATENT DOCUMENTS

| | | |
|---|---|---|
| WO | 2005091794 A2 | 10/2005 |
| WO | 2006059403 A1 | 6/2006 |

OTHER PUBLICATIONS

Partial International Search Report—PCT/07/083057, International Search Authority—European Patent Office—Apr. 25, 2008.

QUALCOMM Europe: "System Operation of SU-MIMO and MU-MIMO" Aug. 28, 2006-Sep. 1, 2006; retrieved from the Internet; URL:http://www.3gpp.org/ ftp/tsg_ran/wgl_r11/TSGR1_46/Docs/R1-062043.zip; downloaded on May 18, 2010.

Taiwan Search Report—TW096141071—TIPO—Jun. 10, 2011.

Written Opinion—PCT/US07/083057—International Search Authority, European Patent Office—Sep. 11, 2008.

* cited by examiner ically, in wireless communications a majority of spectrum bandwidth, as well as base station transmit power, is regulated. Design around such constraints has led to multiple-input multiple-output (MIMO) systems as a path toward realizing increased peak data rate, spectral efficiency, and quality of service. A MIMO system consists of transmitter(s) and receiver(s) equipped, respectively, with multiple ($N_T$) transmit antennas and multiple ($N_R$) receive antennas for data transmission. A variant of a MIMO system that still presents gains compared to single-input single-output (SISO) systems is a single-input multiple-output (SIMO) system. A MIMO channel formed by the $N_T$ transmit and $N_R$ receive antennas may be decomposed into $N_V$ independent channels, which are also referred to as spatial eigenchannels, where $1 \leq N_V \leq \min\{N_T, N_R\}$.

UNIFIED DESIGN AND CENTRALIZED SCHEDULING FOR DYNAMIC SIMO, SU-MIMO AND MU-MIMO OPERATION FOR RL TRANSMISSIONS

CROSS-REFERENCE TO RELATED APPLICATION

This application is a continuation of U.S. patent application Ser. No. 12/443,796, entitled "UNIFIED DESIGN AND CENTRALIZED SCHEDULING FOR DYNAMIC SIMO, SU-MIMO AND MU-MIMO OPERATION FOR RL TRANSMISSIONS", filed Jun. 9, 2009, now allowed, which claims priority to International Patent Application Serial No. PCT/US2007/83057, entitled "UNIFIED DESIGN AND CENTRALIZED SCHEDULING FOR DYNAMIC SIMO, SU-MIMO AND MU-MIMO OPERATION FOR RL TRANSMISSIONS", filed Oct. 30, 2007, expired, which claims the benefit of U.S. Provisional Application Ser. No. 60/863,793, entitled "A METHOD AND APPARATUS FOR SCHEDULING UL TRANSMISSION", filed Oct. 31, 2006, expired, the entirety of which are incorporated herein by reference.

BACKGROUND

I. Field

The following description relates generally to wireless communications, and more particularly to a pilot design and centralized scheduling for dynamic SIMO, SU-MIMO and MU-MIMO mode of operation for reverse link transmissions.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems; time division multiple access (TDMA) systems; frequency division multiple access (FDMA) systems and orthogonal frequency division multiple access (OFDMA) systems; 3rd Generation Partnership Project 2 Ultra Mobile Broadband (UMB); and 3rd Generation Partnership Project Long Term Evolution (LTE) systems. Generally, each terminal communicates with one or more base stations via transmissions on forward and reverse links. The forward link (or downlink) refers to the communication link from a base station(s) to a terminal(s), and the reverse link (or uplink) refers to communication from a terminal(s) to a base station(s). These communication links may be established via single and/or multiple receive/transmit antennas at base stations or terminals.

Addition MIMO systems can provide improved performance (e.g., higher throughput, greater capacity, or improved reliability, or any combination thereof) if the additional dimensionalities created by the multiple transmit and receive antennas are utilized. It should be appreciated that although SIMO systems afford a somewhat lesser improvement in performance, such systems avoid complexity at the receiver, by employing only a single antenna in the user equipment and relying on multiple antennas at base stations. MIMO systems can be divided in two operational classes: (i) Single-user MIMO, and (ii) multi-user MIMO. A main goal of single-user MIMO (SU-MIMO) operation can be to increase peak data rate per terminal, whereas a main goal in multi-user MIMO (MU-MIMO) can be to increase sector (or service cell) capacity. Operation in each of these classes has advantages. SU-MIMO exploits spatial multiplexing to provide increased throughput and reliability, MU-MIMO exploits multi-user multiplexing (or multi-user diversity) to further gains in capacity. Additionally, MU-MIMO benefits from spatial multiplexing even when user equipment has a single receiver antenna.

To benefit from the improved performance derived from the MIMO paradigm of wireless communication, while servicing simultaneously SIMO, SU-MIMO, and MU-MIMO users without detriment to any of such modes of operation, there is a need for a systems and methods that provide for a unified and centralized, as well as a dynamic, scheduling of SIMO, SU-MIMO, and MU-MIMO transmissions.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In an aspect, a method employed in wireless communication system is disclosed herein, the method comprising: transmitting at least one power control reference signal from an antenna selected from a group of M antennas, with M a positive integer; conveying a power spectral density (PSD) offset from the antenna employed to report the at least one power control reference signal, wherein the PSD offset is based at least in part on a reference PSD level for transmitting the at least one power control reference signal; and transmitting a pilot signal from each antenna in the set of M antennas for estimating a multiple-input multiple output channel when M>1, and a SIMO channel when M=1.

In another aspect, it is disclosed a a wireless communication device, comprising: a processor configured to transmit a power control reference signal from an antenna selected from a set of virtual antennas or physical antennas; to convey a power spectral density (PSD) value from the selected antenna, the PSD value is determined at least in part by a reference PSD employed to report the power control reference signal; to transmit periodically a sounding reference signal from each of the antennas in the set of virtual antennas or physical antennas; and a memory coupled to the processor.

In yet another aspect, the subject description discloses an apparatus that operates in a wireless communication environment, the apparatus comprising: means for transmitting at least one power control reference signal from an antenna selected from a group including M virtual antennas or G physical antennas, with M and G positive integers; means for conveying a power spectral density (PSD) offset from the antenna employed to report the at least one power control reference signal; and means for transmitting a pilot signal from each of the antennas in the group of M virtual antennas, or the group of G physical antennas.

In still a further aspect, it is disclosed a computer program product, comprising a computer-readable medium including: code for causing at least one computer to transmit at least one power control reference signal from an antenna selected from a group of M antennas, with M a positive integer; code for causing the at least one computer to convey a power spectral density (PSD) offset from the antenna employed to report the at least one power control reference signal, wherein the PSD offset is based at least on a reference PSD level for transmitting the at least one power control reference signal; and code for causing the at least one computer to transmit a pilot signal from each antenna in the set of M antennas.

The subject innovation, in an aspect, discloses another method employed in wireless communication system, the method comprising: estimating a single-input multiple-output (SIMO) or multiple-input multiple-output (MIMO) channel based at least in part on receiving a set of pilot signals transmitted by M antennas; determining a power spectral density for transmitting data in a reverse link (RL) according to a set of scheduled data streams; determining a data rate for conveying data in a RL according to the set of scheduled data streams; and scheduling an access terminal in one of single-input multiple-output (SIMO) operation, single-user MIMO operation, or multiple-user MIMO operation.

In another aspect, it is disclosed an apparatus that operates in a wireless communication system, the apparatus comprising: means for estimating a wireless channel; means for determining a power spectral density for transmitting data in a reverse link (RL) according to a set of scheduled data streams; means for determining a data rate for conveying data in a RL according to the set of scheduled data streams; and means for scheduling a terminal in one of single-input multiple-output (SIMO) operation, single-user MIMO operation, or multiple-user MIMO operation.

In yet another aspect, the subject innovation discloses a wireless communication device comprising: a processor configured to estimate a single-input multiple-output (SIMO) or multiple-input multiple-output (MIMO) channel; to determine a power spectral density for transmitting data in a reverse link (RL) according to a set of scheduled data streams; to determine a data rate for conveying data in a RL according to the set of scheduled data streams; and to schedule an access terminal in one of single-input multiple-output (SIMO) operation, single-user MIMO operation, or multiple-user MIMO operation; and a memory coupled to the processor.

In a still further aspect, the subject description discloses a computer program product comprising a computer-readable medium including: code for causing at least one computer to estimate a single-input multiple-output (SIMO) or multiple-input multiple-output (MIMO) channel; code for causing the at least one computer to determine a power spectral density for transmitting data in a reverse link (RL) according to a set of scheduled data streams; code for causing the at least one computer to determine a data rate for conveying data in a RL according to the set of scheduled data streams; and code for causing the at least one computer to schedule a terminal in one of single-input multiple-output (SIMO) operation, single-user MIMO operation, or multiple-user MIMO operation.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
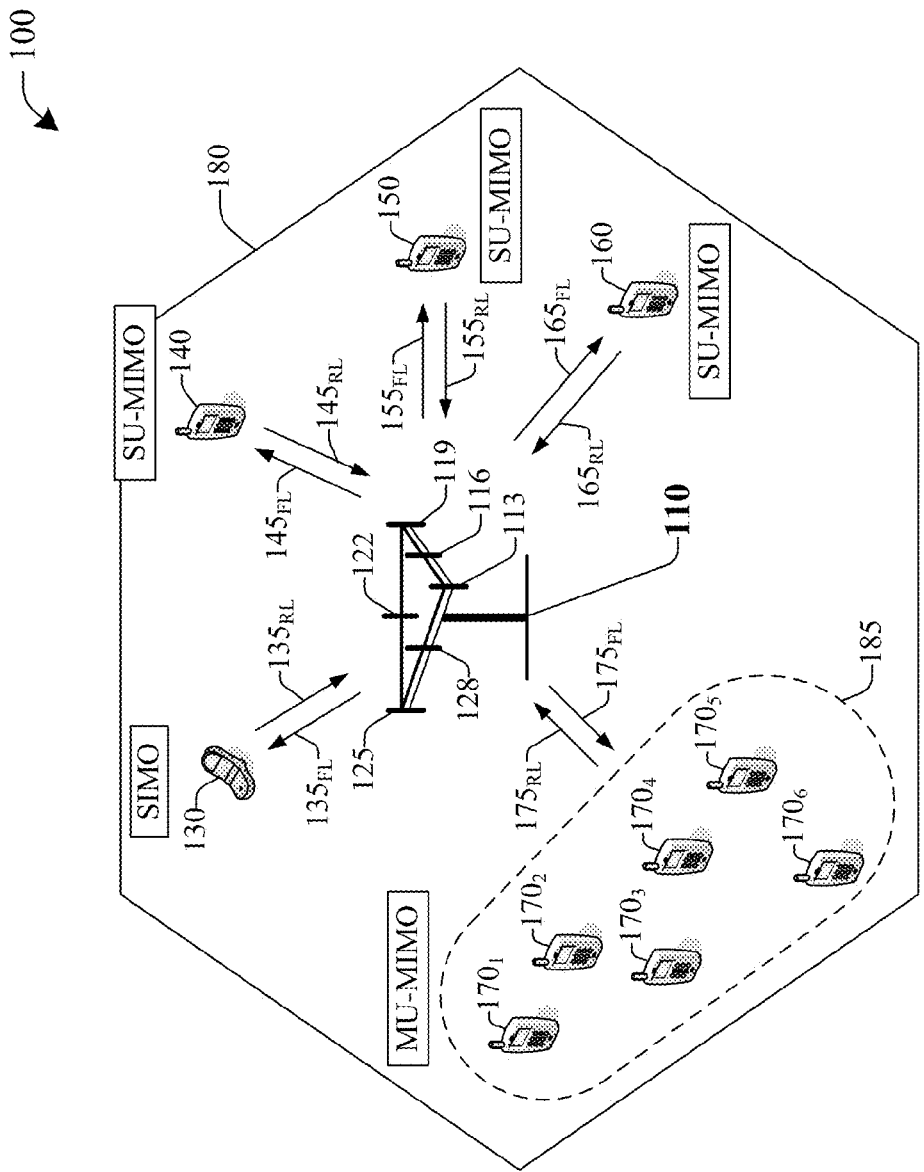
FIG. 1 illustrates a multiple access wireless communication system where an access point with multiple antennas simultaneously communicates with various access terminals that operate in SIMO, SU-MIMO, and MU-MIMO mode according to aspects disclosed herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution.

For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a remote station, an access point, a remote terminal, an access terminal, user terminal, a user agent, a user device, a customer premises equipment, or a user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), or some other terminology.

Referring to the drawings, FIG. 1 illustrates a multiple access wireless communication system 100 where an access point 110 with multiple antennas 113-128 simultaneously schedules, and communicates with, various mobile terminals in SIMO, SU-MIMO, and MU-MIMO modes of operation according to aspects disclosed herein. The mode of operation is dynamic: access point 110 can reschedule the mode of operation of each of terminals 130-160 and $170_1$-$170_6$. In view of the latter, FIG. 1 illustrates a snapshot of communication links between terminals and antennas. As illustrated, such terminals can be stationary or mobile and, dispersed throughout a cell 180. As used herein and generally in the art, the term "cell" can refer to base station 110 and/or its coverage geographic area 180 depending on the context in which the term is used. Further, a terminal (e.g., 130-160 and $170_1$-$170_6$) can communicate with any number of base stations (e.g., shown access point 110) or no base stations at any given moment. It is noted that terminal 130 has a single antenna and therefore it operates in SIMO mode substantially at all times.

Generally, access point 110 possesses $N_T \geq 1$ transmit antennas. Antennas in access point 110 (AP) are illustrated in multiple antenna groups, one including 113 and 128, another including 116 and 119, and an additional including 122 and 125. In FIG. 1, two antennas are shown for each antenna group, even though more or fewer antennas can be utilized for each antenna group. In the snapshot illustrated in FIG. 1, access terminal 130 (AT) operates in SIMO communication with antennas 125 and 122, where antennas 125 and 122 transmit information to access terminal 130 over forward link $135_{FL}$ and receive information from access terminal 130 over reverse link $135_{RL}$. Mobile terminals 140, 150, and 160 each communicate in SU-MIMO mode with antennas 119 and 116. MIMO channels are formed between each of terminals 140, 150, and 160, and antennas 119 and 116, leading to disparate FLs $145_{FL}$, $155_{FL}$, $165_{FL}$, and disparate RLs $145_{RL}$, $155_{RL}$, $165_{RL}$. Additionally, in the snapshot of FIG. 1, a group 185 of terminals 1701-1706 is scheduled in MU-MIMO, having formed multiple MIMO channels between the terminal in the group 185 and antennas 128 and 113 in access point 110. Forward link $175_{FL}$ and reverse link RL $175_{RL}$ indicate the multiple FLs and RLs existing between terminals $170_1$-$170_6$ and base station 110.

In an aspect, advanced system such as LTE can exploit MIMO operation within both frequency division duplex (FDD) communication and time division duplex (TDD) communication. In FDD communication, links $135_{RL}$-$175_{RL}$ employs different frequency bands from respective links $135_{FL}$-$175_{FL}$. In TDD communication, links $135_{RL}$-$175_{RL}$ and $135_{FL}$-$175_{FL}$ utilize the same frequency resources; however, such resources are shared over time among forward link and reverse link communication.

In another aspect, system 100 can utilize one or more multiple-access schemes, such as CDMA, TDMA, FDMA, OFDMA, single-carrier FDMA (SC-FDMA), space division multiple access (SDMA), and/or other suitable multiple-access schemes. TDMA utilizes time division multiplexing (TDM), wherein transmissions for different terminals 130-160 and $170_1$-$170_6$ are orthogonalized by transmitting in different time intervals. FDMA utilizes frequency division multiplexing (FDM), wherein transmissions for different terminals 130-160 and $170_1$-$170_6$ are orthogonalized by transmitting in different frequency subcarriers. As an example, TDMA and FDMA systems can also use code division multiplexing (CDM), wherein transmissions for multiple terminals (e.g., 130-160 and $170_1$-$170_6$) can be orthogonalized using different orthogonal codes (e.g., Walsh-Hadamard codes) even though such transmissions are sent in the same time interval or frequency subcarrier. OFDMA utilizes orthogonal frequency division Multiplexing (OFDM), and SC-FDMA utilizes single-carrier FDM. OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. While pilot design and scheduling of SIMO, SU-MIMO, and MU-MIMO user described herein are generally described for an OFDMA system, it should be appreciated that the techniques disclosed herein can similarly be applied to substantially any wireless communication system operating in multiple access.

In a further aspect, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Each group of antennas and/or the area in which they are designed to communicate is often referred to as a sector of the access point. A sector can be an entire cell 180, as illustrated in FIG. 1, or a smaller region. Typically, when sectorized, a cell (e.g., 180) includes a few sectors (not shown) covered by a single access point, such as 110. It should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. While the following description generally relates to a system in which each terminal communicates with one serving access point (e.g., 110) for simplicity, it should further be appreciated that terminals can communicate with substantially any number of serving access points.

In communication over forward links $135_{FL}$-$175_{FL}$, the transmitting antennas of access point 110 can utilize beamforming (e.g., to effect SDMA communication) in order to improve the signal-to-noise ratio of forward links for the different access terminals 130-160 and $170_1$-$170_6$. Also, an access point using beamforming to transmit to access terminals scattered randomly through its coverage causes less interference to access terminals in neighboring cells than an access point transmitting through a single antenna to all its access terminals.

It is noted that base station 110 can communicate via backhaul network with other base stations (not shown) that serve other cells (not shown) in the cellular network of which cell 180 is part of Such communication is a point-to-point communication effected over the cellular network backbone, which can employ of T-carrier/E-carrier links (e.g., T1/E1 lines), as well as packet-based internet protocol (IP).

Figure 2:
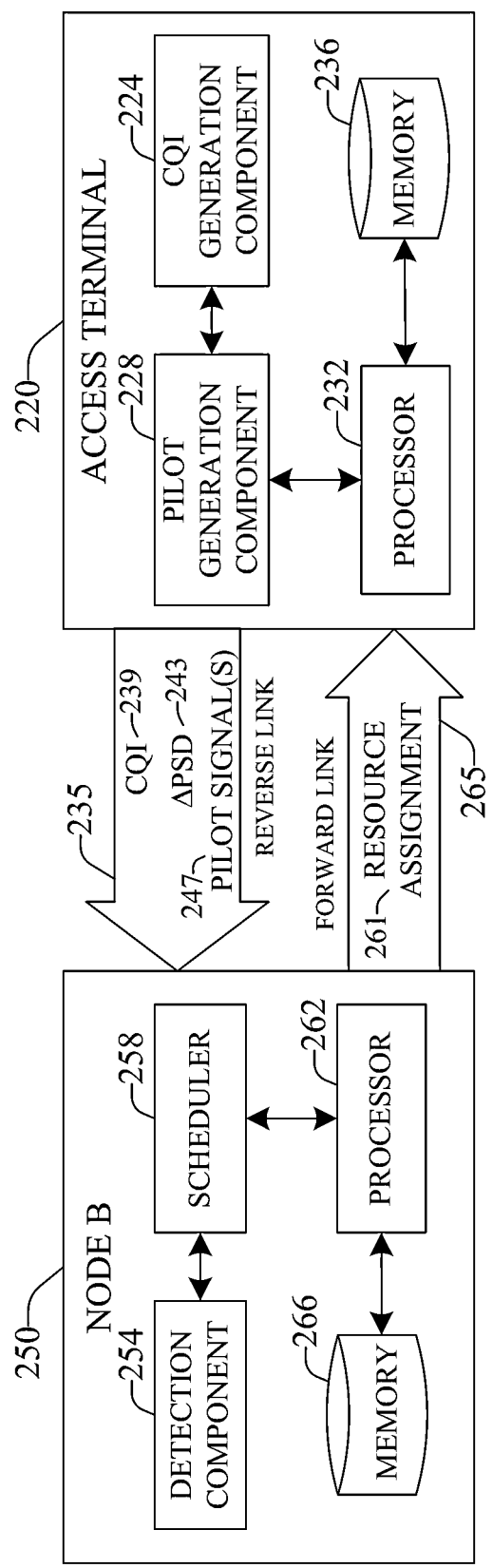
FIG. 2 is a high level block diagram of a system 200 to that facilitates dynamic, centralized scheduling and joint UL operation of an access terminal in SIMO, SU-MIMO, or MU-MIMO mode.

FIG. 2 is a high level block diagram of a system 200 to that facilitates dynamic, centralized scheduling and joint UL operation of an access terminal in SIMO, SU-MIMO, or MU-MIMO mode. Access terminal 220 conveys system information (a CQI 239, a powers spectral density (PSD) offset 243, and pilot signal(s) 247) via reverse link 235 to Node B 250, which processes such information and communicates a resource assignment 261 to the access terminal through DL 265. It is noted that access terminal 220 can operate with up to $N_R \geq 1$ physical antennas with associated transceivers (not shown), and Node B 250 operates with $N_T \geq 1$ antennas. It is further noted that the while MU-MIMO mode involves multiple terminals, scheduling of this mode according to aspects of the subjection innovation relies on communication of system information from a single terminal. Next, various aspects of the subject innovation that facilitate joint SIMO, SU-MIMO, and MU-MIMO operation are described.

A MIMO channel formed by the $N_T$ transmit and $N_R$ receive antennas is a $N_R \times N_T$ matrix channel of complex numbers that can be decomposed (via a single value decomposition) into $N_V$ independent (eigen)channels, which are also referred to as spatial channels, or orthogonal streams or layers, where $1 \leq N_V \leq \min\{N_T, NR\}$ is the spatial multiplexing or diversity order. Each of the $N_V$ independent channels corresponds to a dimension. It should be appreciated that communication that exploits an orthogonal stream does not exhibit inter-stream interference. Such decomposition allows the formation of virtual antennas, which can be defined as rotations of the physical antennas that exploit equally the $N_T$ physical antennas at a transmitter, wherein channel statistics is preserved and power is equally distributed among physical antennas. Such rotations are characterized by an $N_T \times N_T$ unitary matrix U ($U^H U = UU^H = 1$, where 1 is the $N_T \times N_T$ identity matrix, and $\overline{U^H}$ is the Hermitian conjugate of U) is used. The number of available virtual antenna subsets $[\overline{n(V)}]$ depends on both $N_T$ and $N_R$:

$$n(V) = \Sigma_{1 \leq q \leq \min\{NT,NR\}} N_T! [q!(N_T-q)!]^{-1}, \quad (1)$$

where $n! = 1 \cdot 2 \ldots (n-1) \cdot n$ is the factorial function for integer number n. For a symmetric ($N_T$, $N_R = N_T$) configuration of TX and RX antennas, Eq. (3) predicts $n(V) = 2^{N_T} - 1$ possible non-equivalent sets of virtual antennas. Each of these sets has $N_V$ virtual antennas.

CQI 239.

Access terminal 220 transmits CQI 239 in UL 235 from a single physical antenna or virtual antenna regardless the number of allowed physical/virtual available to the mobile. Such determination ensures that terminals with $N_R = 1$ can be jointly scheduled with terminals with a higher number of antennas. Reported CQI 239 is based on a received known pilot sequence of symbols which is transmitted by serving base station (e.g., Node B 250). Various sequences can be employed, for example: a constant amplitude zero autocorrelation (CAZAC) sequence, a pseudorandom code, or a pseudonoise sequence, or a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence). In an aspect, CQI generation component 224 receives the pilot signal, conveyed according to a specific multiple access mode of operation (e.g., CDMA, FDMA, or TDMA) and determines a CQI. After determination of a CQI value, access terminal 220, via generation component 224, transmits a CQI channel, which reports CQI 239, employing a reference level of power or power spectral density. The CQI channel content, e.g., CQI 239, is modulated with a constant amplitude zero autocorrelation (CAZAC) sequence. The channel quality indication can be based at on a least one of a signal-to-interference ratio, a signal-to-noise ratio, a signal-to-interference-and-noise ratio, etc. In a further aspect, a mobile can determine whether to employ physical antennas or virtual antennas for transmission of CQI 239. It should be appreciated that such flexibility arises form the fact that the CQI 239 is processed/determined at the access terminal 220 and Node B 250 can dispense with the knowledge of whether a physical or virtual antenna is employed for CQI transmission, as the actual information that is necessary is the value of the channel quality indication. It is noted, however, that CQI 239 is detected in access point 250, via detection component 254.

ΔPSD 243.

Access terminal 220 always feeds back a single ΔPSD; a power spectral density (PSD) adjustment (e.g., control) that is determined based at least in part on the reference PSD level of the transmitted CQI channel, which reports CQI 239, and the associated physical, or virtual, antenna that the terminal (e.g., 220) employs for CQI transmission (see below). Conveying a single ΔPSD 243 affords consistency with scheduling a terminal with $N_R=1$ jointly with terminals scheduled in SU-MIMO and/or MU-MIMO. It should be appreciated that while the CQI channel is employed as a reference signal for power control, substantially any other reference signal, transmitted at PSD reference level and conveyed through a corresponding channel, can be utilized for power control and to determine ΔPSD 243.

Pilot Signal(s) 247.

Sounding (pilot) reference signals can be transmitted periodically from multiple physical or virtual antennas in MIMO capable terminal (e.g., $N_R>1$) to perform MIMO channel estimation at the transmitter, e.g., Node B 250. SIMO user equipment conveys a single pilot transmitted from a single antenna. It should be appreciated that MIMO channel sounding is necessary to benefit from beamforming, or precoding, gain in the MIMO capacity (and throughput), as well as multi-user diversity. Sounding reference signals (RSs) are generated at an access terminal (e.g., 220) by pilot generation component 228. In an aspect, generated pilot sequences can be a CAZAC sequence, a pseudorandom code, or a pseudonoise sequence, or a Gold sequence, a Walsh-Hadamard sequence, an exponential sequence, a Golomb sequence, a Rice sequence, an M-sequence, or a GCL sequence. It should be appreciated, however, that since mobiles conveying sounding RSs can share multiple access channels for multiplexing, orthogononal RSs can reduce inter-carrier interference, improving the likelihood of successful decoding at a base station (e.g, 250) and thus reducing transmission overhead by reducing retransmission cycles.

It is noted that antenna permutation is not applied to the sounding RSs to allow the flexibility of dynamically scheduling SU-MIMO and MU-MIMO.

Similar to the CQI case, an access point 250 can dispense with the knowledge of whether a physical antenna or virtual antenna mapping was employed to transmit the sounding (pilot) reference signal(s) 247.

The information conveyed by the access terminal 220 is employed to by access point 250 to schedule, via scheduler 258, the operation mode (e.g., SIMO, SU-MIMO, and MU-MIMO) of the mobile terminal Users (e.g., access terminals $170_1$-$170_6$) can be scheduled to maximize an objective function such as a sector throughput, a sector capacity, or a plurality of users' power usage. In addition, scheduling determinations performed by scheduler 258 in order to achieve a predetermined quality of service such as a specific bit error rate, a specific latency, or a specific spectral efficiency. Several classical algorithms (e.g., round robin, fair queuing, proportional fairness, and maximum throughput scheduling) and quantum algorithms (e.g., quantum genetic algorithm) can be employed for determined an optimal mode of operation. Processor 262 can execute a portion of the algorithms employed for scheduling. Algorithms, instructions to execute them, and received control information, e.g., CQI 239, ΔPSD 243, and pilot signal(s) 247 can be stored in memory 266. Next, scheduling of SIMO, SU-MIMO and MU-MIMO is described.

SIMO Mode.

Scheduler 258 determines a data rate based on a net PSD level that arises from adding the PSD of the reference signal conveyed to the access terminal to determine CQI 239 and the reported ΔPSD 243 from each of the UEs that are determined to be scheduled in SIMO mode. An access terminal with a highest scheduling metric according to a scheduling algorithm is scheduled with this rate.

SU-MIMO Mode.

Scheduler 258 first estimates a MIMO channel from received pilot signal(s) 247. In cases wherein antenna permutation is to be employed for transmission in SU-MIMO, the estimated MIMO channel is permuted according to a specific permutation pattern determined by access point 250 to allow accurate rate determinations. It should be appreciated that the permutation pattern can be characterized by a unitary matrix P ($PP^+=P^+P=1$, where 1 is the $N_V \times N_V$ identity matrix) defined in the subspace of orthogonal layers $N_V$, such that a codeword in a first layer is permuted to a second layer at each tone or subcarrier assigned for communication. Permutations are generally cyclic or pseudorandom. Unitary matrix P is to be known at access point 250 an access terminal 220. It should be appreciated that a portion of calculations involved in rate determination can be performed by processor 262. Similarly, processor 262 can carry out antenna permutation.

Detection component 254 can include a minimum mean square equalizer (MMSE), a zero forcing (ZF) filter, or maximal ratio combining (MRC) filter. Such detection components can incorporate additionally a successive interference cancellation (SIC) component. Decoding component can be utilized to determine a PSD for each of the received pilot signal(s) 247.

The data PSD (e.g., PSD for data transmission in the RL) that is derived from a first received stream, without consideration of inter-stream or inter-user interference, is dictated by the reference signal PSD in addition to ΔPSD 243. Data PSDs from remaining (pilot) streams correspond to the data PSD of the first stream with the PAR adjustment and path differentials correction according to the MIMO channel. It should be appreciated that a resulting PSD level is to be reduced according to the number of scheduled MIMO streams, in order to maintain the same total transmitted power from terminal 220. As an example, in a case in which two streams are scheduled (through scheduler 258), a ΔPSD is effectively reduced by half for each of the antennas involved in transmission of data. In addition, a ΔPSD is to be adjusted based on an assigned bandwidth to the access terminal when an assigned resource block is smaller than requested. Once data PSD is determined, a rate calculation for various streams with an MMSE receiver and an MMSE-SIC receiver can be performed. Processor 262 can conduct a portion of such calculation.

MU-MIMO Mode.

Access point 250 first estimates the MIMO channel from broadband pilots for terminals (e.g., $170_1$-$170_6$) requesting data transmission. As discussed above, each of the terminals conveys CQI 239, ΔPSD 243, and pilot signal(s) 247. It should be appreciated that an access terminal (e.g., 220) that requests data transmission can be an access terminal that has previously been scheduled, in that case the number of antennas the access terminal employs to convey sounding RSs is known to the access point (e.g., 250); such information can be retained in memory 266. However, if the wireless terminal has not been previously scheduled, an access point can schedule the requesting wireless terminal at a sub-optimal level due to lack of knowledge of antenna configuration. It is noted that a channel estimated from multiple data streams received from a MU-MIMO user are to be permuted with a pattern permutation P' that is to be utilized in the access terminal's data transmission.

Once the MIMO channel has been estimated, data rate is computed from successive decoding of PSD of pilot signal(s) 247. Decoding can be effected through detection component 254, which can include a MMSE-SIC receiver. Upon successful decoding of the multiple received streams associated with pilot signal(s) 247, the rate for each stream is calculated. Processor 262 can conduct a portion of the rate calculations.

To (re)schedule a terminal 220 in SIMO, SU-MIMO, or MU-MIMO mode of operation, access point 250 conveys a resource assignment 261 to the access terminal 220, with a data rate, a data rate offset, antenna subset selection for transmission, and antenna pattern selection.

Figure 3A:
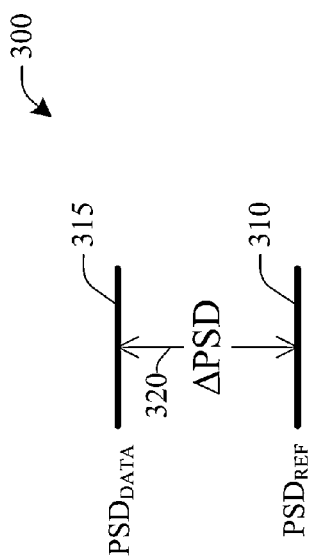
FIGS. 3A and 3B are schematic diagrams that illustrate, respectively, the relative magnitude of a reference signal power received by a terminal to determine CQI and the data PSD employed to transmit data in a RL, and sounding (pilot) reference signals.

FIG. 3A is a schematic diagram 300 that illustrates the relative magnitude of a reference signal power, $P_{REF}$ 310, employed by a mobile terminal to transmit a CQI channel reference signal reporting a CQI value, and the $PSD_{DATA}$ 315 employed to transmit data in the RL. $PSD_{DATA}$ is determined via ΔPSD 320 feed back by the mobile terminal (e.g., 130, 140, or 220) that reports CQI. As discussed above, the single (physical or virtual) antenna employed to report CQI is utilized to convey ΔPSD 320 independently of the available antennas to the terminal. When a physical antenna is employed, ΔPSD 320 can be calculated (by processor 232, for example) based on power headroom of a power amplifier (PA) in the antenna employed to report CQI 239, and on load indicators received from neighboring cells, as well as the reported CQI 239. In addition, other factors such as projected battery lifetime, type of application executed by the wireless terminal—e.g., a wireless terminal that is to execute an application that requires to maintain an active communication link through completion of a task, such as an on-line banking transference of funds, can disregard other sector interference indicators and report ΔPSD 320 higher that expected from inter-cell interference considerations. If a virtual antenna is utilized, and the PA of each physical antenna available to the terminal is substantially of the same type (e.g., rail voltages, input/output impedance, and so on), ΔPSD 320 can be calculated based on the remaining headroom of substantially any of the PAs that operate substantially any of the physical antennas combined to compose the virtual antenna. A PA is better utilized when CQI 243 is conveyed from a virtual antenna. Alternatively, or in addition, ΔPSD 320 can be tabulated based on a modulation and coding scheme assigned to the access terminal.

Figure 3B:
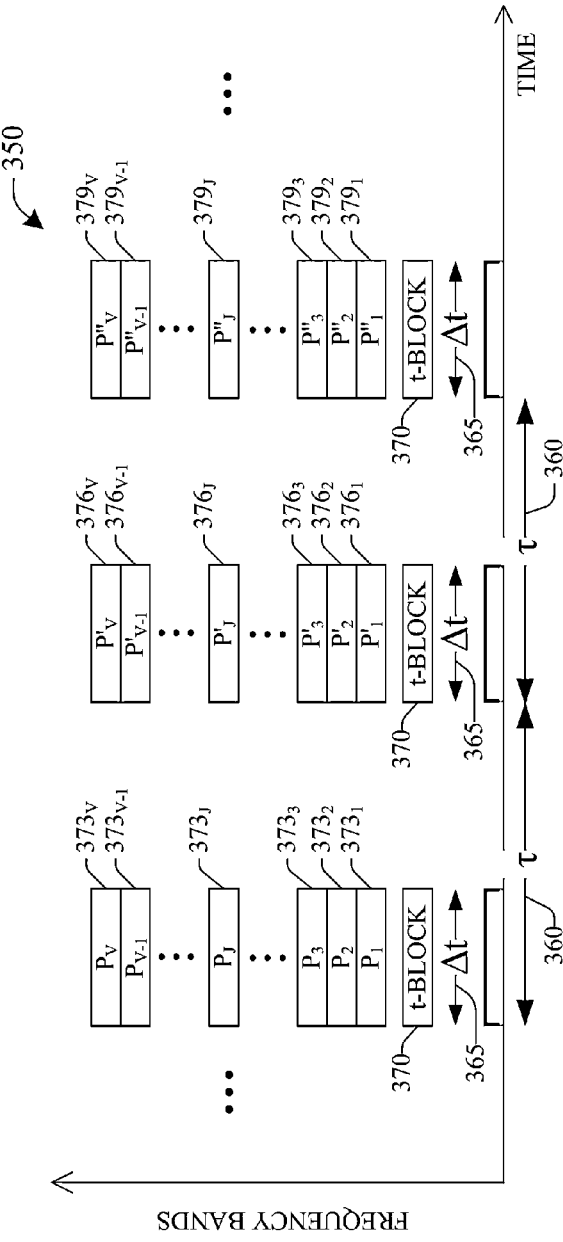

FIG. 3B is a schematic diagram 350 of sounding (pilot) reference signals. Sounding RSs $P_1$-$P_V$ 373$_1$-373$_V$, $P'_1$-$P'_V$ 376$_1$-376$_V$, $P''_1$-$P''_V$ 379$_1$-379$_V$, and so on, are transmitted periodically with a period τ 360, which is determined by the fading temporal characteristics (e.g., fast or slow) of the communication channel. As an example, in a sufficiently slow fading channel, compared with a UL traffic time span for a specific user, 1/τ is substantially small. It is noted that the period τ 360 is adaptive, adjusted by an access terminal (e.g., 130, 140, or 220) as channel conditions (e.g., reported CQI 243) evolve. It should be appreciated that at is reduced, processing gain can be realized at a receiving access point; however, communication overhead increases. In an aspect, an RS spans an interval Δt 365, corresponding to what it has been termed herein a "t-block" 370. Such a t-block can correspond to one or more slots carrying the reference. As an example, t-block 370 can correspond to a long block (LB) in a subframe within the radio frame structure in LTE. In another example, t-block can correspond to multiple LBs involving various communication subframes. It should be appreciated that one a t-block is determined, Δt 365 is established. It should further be appreciated that overhead increases with Δt 365; however, conveying multiple block carrying RS can be necessary to ensure successful decoding at an access point (e.g., Node B 250) particularly in poor channel conditions. Pilot generation component 228, in conjunction with processor 232, can determine the period t 360 and t-block span Δt 365.

As illustrated in FIG. 3B, RSs are conveyed in contiguous frequency resources, e.g., 373$_1$-373$_V$. Each of such frequency resources correspond to a specific number of subbands that carries a sequence, e.g., $P_1$-$P_V$, or a portion thereof, for a physical or virtual antenna J (J=1, . . . , V). Frequency interleaved allocation of frequency resources, as well as communication of sounding RSs, is also possible.

It should be appreciated that the reference signal design, both to communicate CQI (e.g., 239) and channel sounding, as well as the power control (ΔPSD) design are substantially the same for SIMO, SU-MIMO and MU-MIMO.

Figure 4:
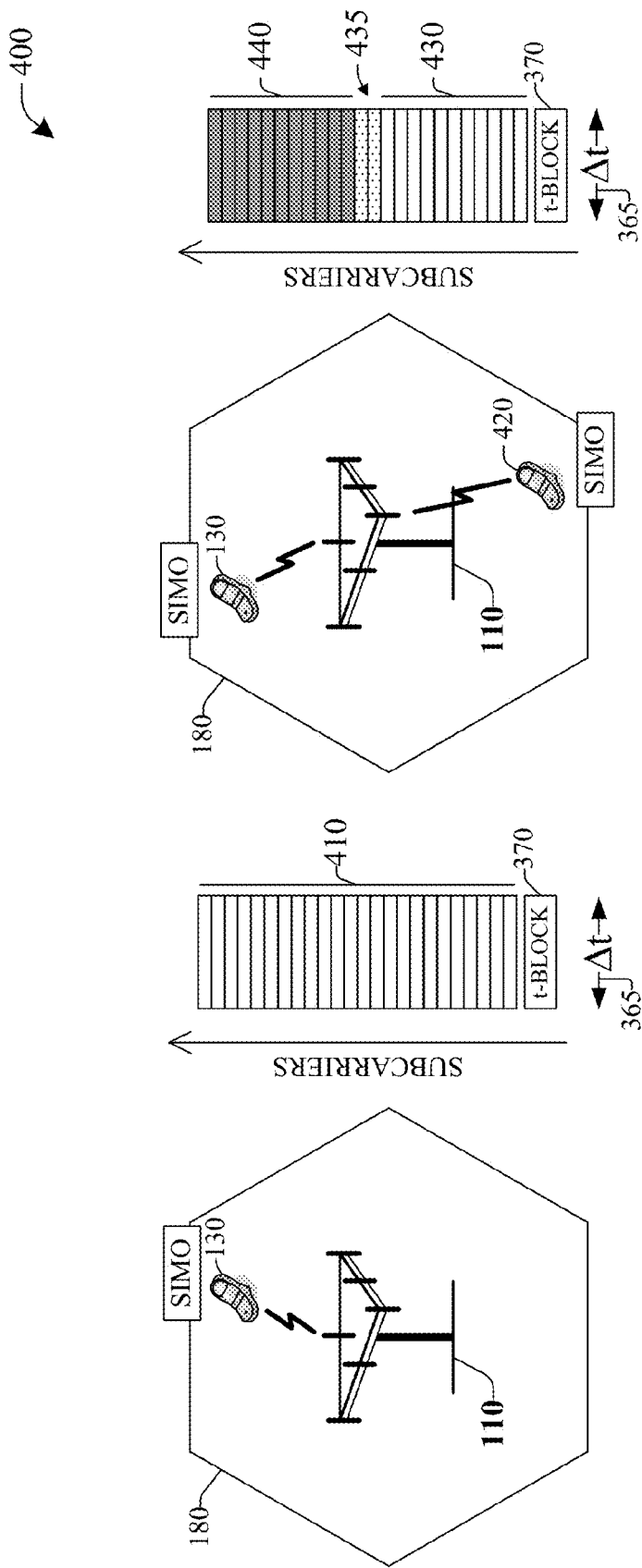
FIG. 4 is a diagram that illustrates pilot assignment of frequency resources for multiple users.

FIG. 4 is a schematic diagram 400 that illustrates pilot assignment of frequency resources for multiple users. To achieve joint performance of SIMO, SU-MIMO, and MU-MIMO mode of operation it is necessary to preserve orthogonality among the sounding RSs of the spatially divided users. In order to preserve pilot orthogonality, the maximum allowed spatial multiplexing order N for a scheduled user within the cell, derived from sounding reference signals, is to be broadcasted by a serving base station to the user. As an example, and not as a limitation, in the case a single SIMO user 130 is scheduled by base station 110 in cell 180, such user can transmit sounding RSs in substantially all available time-frequency resources 410. However, when SIMO user 130 is scheduled simultaneously with another SIMO user 140, each of said users can use a portion of the available time-frequency resources to convey mutually orthogonal pilots—e.g., subcarriers 430 can be employed by user 420, whereas user 430 can employ subcarriers 440. It is noted that guard subcarriers 435 separate the available frequency resources to further ensure orthogonality. Pilots are conveyed in a t-block 370 that spans a time interval Δt 365. It should be appreciated that the previous example can be cast for SU-MIMO user, MU-MIMO user, or a combination thereof, instead of SIMO users 130 and 420.

Figure 5:
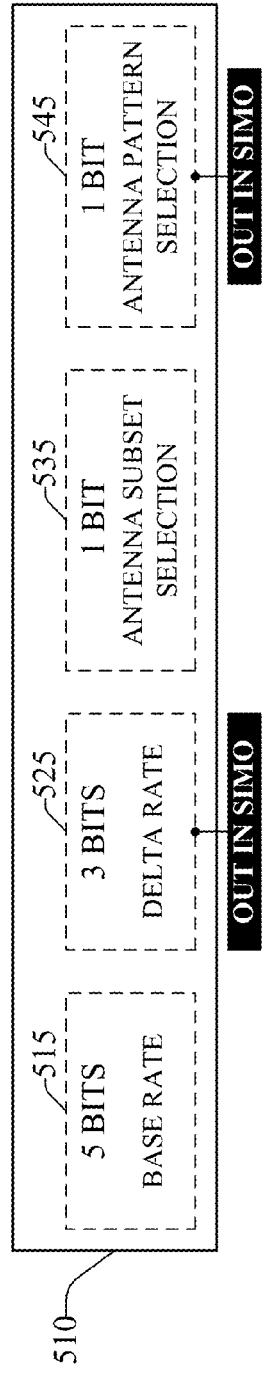
FIG. 5 is a diagram of UL assignment channel structures for scheduling joint operation of SIMO, SU-MIMO, and MU-MIMO users.
Figure 5:
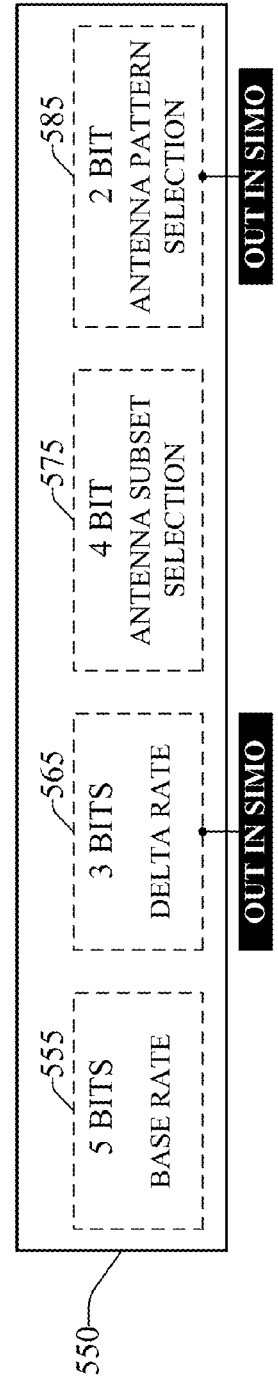

FIG. 5 is a schematic diagram 500 of example UL assignment channel structures for scheduling joint operation of SIMO, SU-MIMO, and MU-MIMO users. Structures 510 and 550 correspond, respectively, to a maximum spatial multiplexing order $N_V$=2 and $N_V$=4. In an aspect, an assignment for a scheduled user equipment includes a base rate, an offset (or delta) data rate for additional streams in case such additional streams are assigned, an antenna subset selection index, and an antenna pattern selection. Typically, scheduling assignments are conveyed by a serving base station (e.g., 110) over a downlink physical control channel. As an example, in LTE, scheduling assignments are conveyed in the physical downlink control channel (PDCCH). In general, PDCCH can be conveyed in a subframe (e.g., an LTE subframe spans 0.5 ms, carrying 6 or 7 OFDM symbols depending on cyclic prefix length). Structure 510.—Data rate 515 is conveyed with 5 bits and delta data rate 525 is conveyed with 3 bits; antenna subset selection 535 is assigned with 1 bit; and antenna pattern selection 545 is communicated with 1 bit. It is noted that antenna subset selection (index) 535 can be included into the delta data rate 525. Moreover, the 1 bit antenna pattern selection can be removed if at substantially all times an access point (e.g., 110) pairs users with different virtual antenna indexes. By pairing users with different virtual antenna indexes, radiation profiles associated with the rotations leading to said virtual antennas are nearly orthogonal and inter-stream interference is largely mitigated. Therefore, Structure 550.—The subject structure transmits data rate 555 with 5 bits and delta data rate 525 with 3 bits. In contrast to structure 510, antenna subset selection 575 is communicated with 4 bits; and antenna pattern selection is conveyed with 3 bits. If we only assign users with different virtual antenna indexes, the 2 bits of antenna pattern selection can be removed. The pilot pattern would be determined directly from the antenna index.

For both structures 510 and 520, when scheduling SIMO users, payload (or overhead) can be reduced since the serving base station (e.g., Node B 250) and a user's terminal (e.g., access terminal 220) are aware that no more than a single stream can be assigned. In such cases, delta data rates 525 and 565, and antenna pattern selection 545 and 585 need not be assigned. It should be appreciated that structures 510 and 550 can be employed in both FDD and TDD. It should further be appreciated that the specific number of bits to convey an UL assignment disclosed hereinbefore can be modified adaptively, depending on at least the following: channel conditions, a number of users in a service cell, a remaining battery lifetime in the terminal being scheduled, a type of application executed or to be executed by the terminal being scheduled, and so on.

Figure 6:
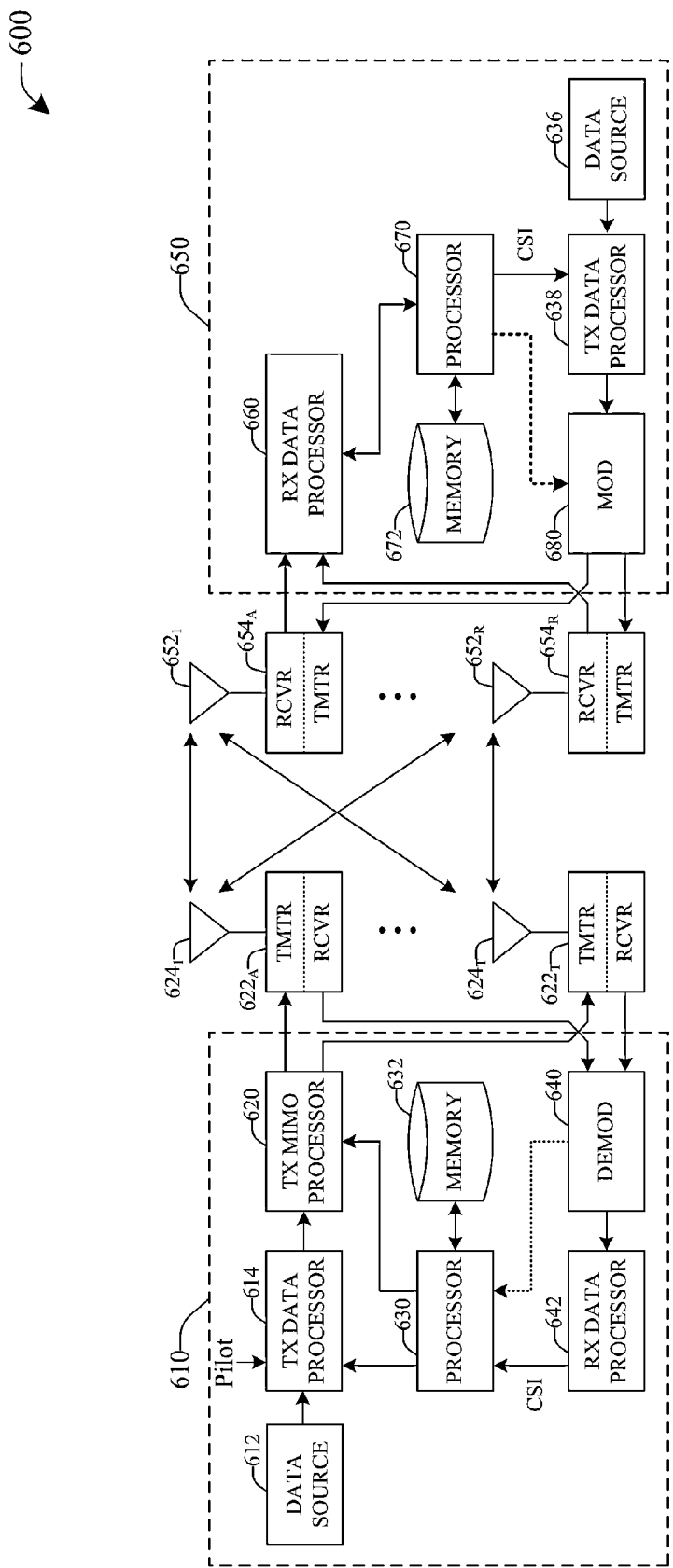
FIG. 6 is a block diagram of an example embodiment of a transmitter system and a receiver system in MIMO operation.

FIG. 6 is a block diagram 600 of an embodiment of a transmitter system 610 (such as Node B 250) and a receiver system 650 (e.g., access terminal 220) in a multiple-input multiple-output (MIMO) system that can provide for cell (or sector) communication in a wireless environment in accordance with one or more aspects set forth herein. At the transmitter system 610, traffic data for a number of data streams can be provided from a data source 612 to transmit (TX) data processor 614. In an embodiment, each data stream is transmitted over a respective transmit antenna. TX data processor 614 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or m-order quadrature amplitude modulation (M-QAM)) selected for that data stream to provide modulation symbols. The data rate, coding, and modulation for each data stream may be determined by instructions executed by processor 630, the instructions as well as the data may be stored in memory 632.

The modulation symbols for all data streams are then provided to a TX MIMO processor 620, which may further process the modulation symbols (e.g., OFDM). TX MIMO processor 620 then provides $N_T$ modulation symbol streams to $N_T$ transceivers (TMTR/RCVR) $622_A$ through $622_T$. In certain embodiments, TX MIMO processor 620 applies beamforming weights (or precoding) to the symbols of the data streams and to the antenna from which the symbol is being transmitted. Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $622_A$ through $622_T$ are then transmitted from $N_T$ antennas $624_1$ through $624_T$, respectively. At receiver system 650, the transmitted modulated signals are received by $N_R$ antennas $652_1$ through $652_R$ and the received signal from each antenna 652 is provided to a respective transceiver (RCVR/TMTR) $654_A$ through $654_R$. Each transceiver $654_1$-$654_R$ conditions (e.g., filters, amplifies, and downconverts) a respective received signal, digitizes the conditioned signal to provide samples, and further processes the samples to provide a corresponding "received" symbol stream.

An RX data processor 660 then receives and processes the $N_R$ received symbol streams from $N_R$ transceivers $654_1$-$654_R$ based on a particular receiver processing technique to provide $N_T$ "detected" symbol streams. The RX data processor 660 then demodulates, deinterleaves, and decodes each detected symbol stream to recover the traffic data for the data stream. The processing by RX data processor 660 is complementary to that performed by TX MIMO processor 620 and TX data processor 614 at transmitter system 610. A processor 670 periodically determines which pre-coding matrix to use, such a matrix can be stored in memory 672. Processor 670 formulates a reverse link message comprising a matrix index portion and a rank value portion. Memory 672 may store instructions that when executed by processor 670 result in formulating the reverse link message. The reverse link message may comprise various types of information regarding the communication link or the received data stream, or a combination thereof. As an example, such information can comprise channel quality indication(s) (such as CQI 239), an offset for adjusting a scheduled resource (such as ΔPSD 243), and/or sounding reference signals for link (or channel) estimation. The reverse link message is then processed by a TX data processor 638, which also receives traffic data for a number of data streams from a data source 636, modulated by a modulator 680, conditioned by transceiver $654_A$ through $954_R$, and transmitted back to transmitter system 610.

At transmitter system 610, the modulated signals from receiver system 650 are received by antennas $624_1$-$624_T$, conditioned by transceivers $622_A$-$622_T$, demodulated by a demodulator 640, and processed by a RX data processor 642 to extract the reserve link message transmitted by the receiver system 650. Processor 630 then determines which pre-coding matrix to use for determining the beamforming weights and processes the extracted message.

As discussed above, in connection with FIG. 2, receiver 650 can be dynamically scheduled to operate in SIMO, SU-MIMO, and MU-MIMO. Next, communication in these modes of operation is described. It is noted that in SIMO mode a single antenna at the receiver ($N_R$=1) is employed for communication; therefore, SIMO operation can be interpreted as a special case of SU-MIMO. Single-user MIMO mode of operation corresponds to the case in which a single receiver system 650 communicates with transmitter system 610, as previously illustrated FIG. 6 and according to the operation described in connection therewith. In such a system, the $N_T$ transmitters $624_1$-$624_T$ (also known as TX antennas) and $N_R$ receivers $652_1$-$652_R$ (also known as RX antennas) form a MIMO matrix channel (e.g., Rayleigh channel, or Gaussian channel, with slow or fast fading) for wireless communication. As mentioned above, the SU-MIMO channel is described by a $N_R \times N_T$ matrix of random complex numbers. The rank of the channel equals the algebraic rank of the $N_R \times N_T$ matrix, which in terms of space-time, or space-frequency coding, the rank equals the number $N_V \leq \min\{N_T, N_R\}$ of independent data streams (or layers) that can be sent over the SU-MIMO channel without inflicting inter-stream interference.

In one aspect, in SU-MIMO mode, transmitted/received symbols with OFDM, at tone ω, can be modeled by:

$$y(\omega) = \underline{H}(\omega)c(\omega) + n(\omega). \quad (2)$$

Here, y(ω) is the received data stream and is a $N_R \times 1$ vector, $\underline{H}(\omega)$ is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 610, and $N_V$ can be scheduled at the discretion of the transmitter (e.g., transmitter 610, Node B 250, or access point 110) based at least in part on channel conditions (e.g., reported CQI) and the rank reported in a scheduling request by a terminal (e.g., receiver 650). It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 610 allocates to transmit each data stream $N_V$. It should be appreciated that such a power gain matrix can be a resource that is assigned to a terminal (e.g., access terminal 220, receiver 650, or UE 140), and it can be controlled through power adjustment offsets, such as ΔPSD 243 as described hereinbefore.

Figure 7:
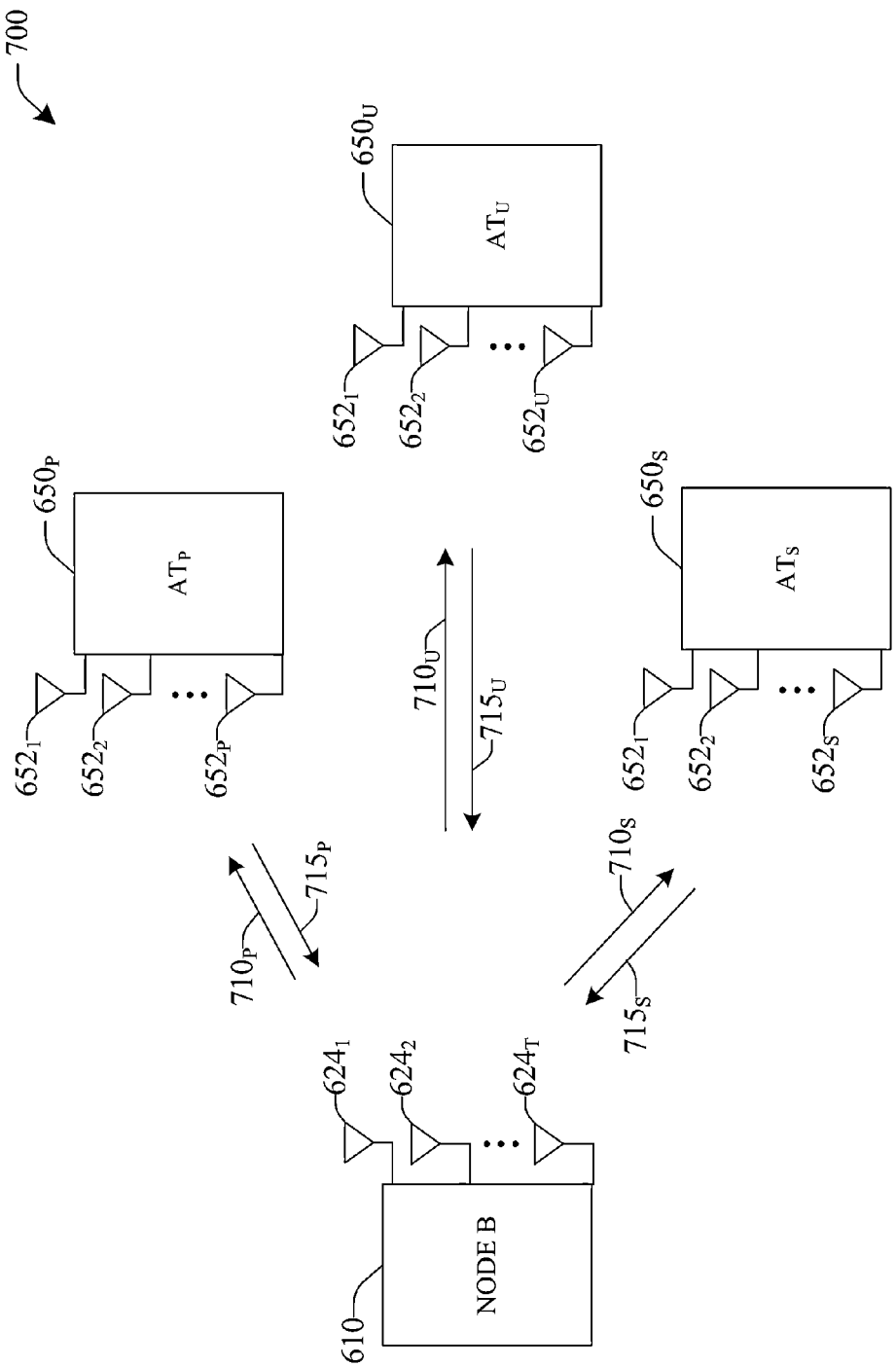
FIG. 7 illustrates an example MU-MIMO system.

As mentioned above, according to an aspect, MU-MIMO operation of a set of terminals (e.g., mobiles $170_1$-$170_6$) is within the scope of the subject innovation. Moreover, scheduled MU-MIMO terminals operate jointly with SU-MIMO terminals and SIMO terminals. FIG. 7 illustrates an example multiple-user MIMO system 700 in which three ATs $650_P$, $650_U$, and $650_S$, embodied in receivers substantially the same as receiver 650, communicate with transmitter 610, which embodies a Node B. It should be appreciated that operation of system 700 is representative of operation of substantially any group (e.g., 185) of wireless devices, such as terminals $170_1$-$170_6$, scheduled in MU-MIMO operation within a service cell by a centralized scheduler residing in a serving access point (e.g., 110 or 250). As mentioned above, transmitter 610 has $N_T$ TX antennas $624_1$-$624_T$, and each of the ATs has multiple RX antennas; namely, $AT_P$ has $N_P$ antennas $652_1$-$652_P$, $AP_U$ has $N_U$ antennas $652_1$-$652_U$, and $AP_E$ has $N_S$ antennas $652_1$-$652_S$. Communication between terminals and the access point is effected through uplinks $715_P$, $715_U$, and $715_S$. Similarly, downlinks $710_P$, $710_U$, and $710_S$ facilitate communication between Node B 610 and terminals $AT_P$, $AT_U$, and $AT_S$, respectively. Additionally, communication between each terminal and base station is implemented in substantially the same manner, through substantially the same components, as illustrated in FIG. 6 and its corresponding description.

Terminals can be located in substantially different locations within the cell serviced by access point 610 (e.g., cell 180), therefore each user equipment $650_P$, $650_U$, and $650_S$ has its own MIMO matrix channel $h_\alpha$ and response matrix $H_\alpha$ (α=P, U, and S), with its own rank (or, equivalently, singular value decomposition). Intra-cell interference can be present due to the plurality of users present in the cell serviced by the base station 610. Such interference can affect CQI values reported by each of terminals $650_P$, $650_U$, and $650_S$. Similarly, interference also can affect feed back values of power offsets (e.g., ΔPSD 243) employed for power control at Node B 610.

Although illustrated with three terminals in FIG. 7, it should be appreciated that a MU-MIMO system can comprise any number of terminals, each of such terminals indicated below with an index k. In accordance with various aspects, each of the access terminals $650_P$, $650_U$, and $650_S$ can report CQI from a single antenna and can convey a PSD offset feedback, associated with such single antenna, to Node B 610. In addition, each of such terminals can transmit to Node B 610 sounding reference signals from each antenna in the set of antennas employed for communication. Node B 610 can dynamically re-schedule each of terminals $650_P$, $650_U$, and $650_S$ in a disparate mode of operation such as SU-MIMO or SIMO.

In one aspect, transmitted/received symbols with OFDM, at tone ω and for user k, can be modeled by:

$$yk(\omega) = \underline{H}_k(\omega)c_k(\omega) + \underline{H}_k(\omega)\Sigma' c_m(\omega) + n_k(\omega). \quad (3)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $\underline{H}_k$) of symbols transmitted by a transmitter (e.g., access point 250) to the other users in the cell.

Figure 8:
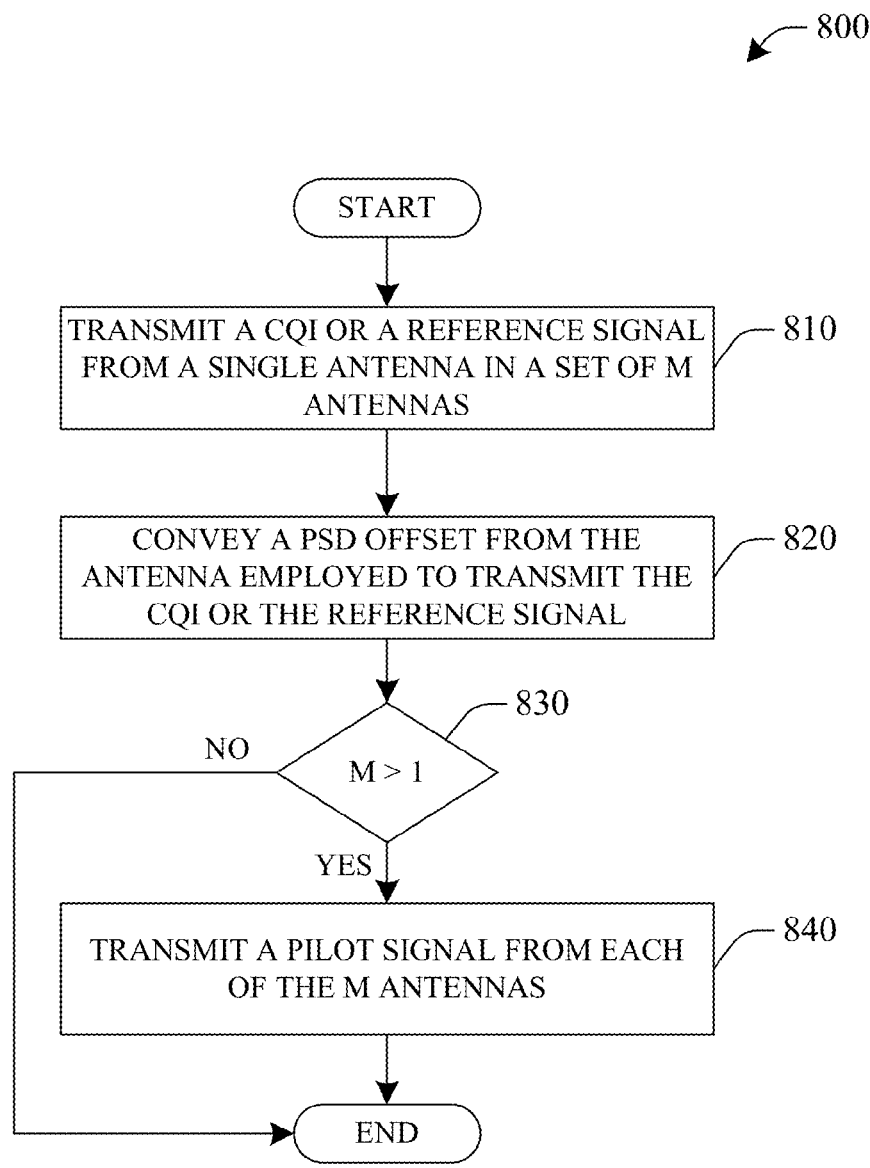
FIG. 8 presents a flowchart of a method for controlling power and pilot signaling according to aspect disclosed herein.
Figure 9:
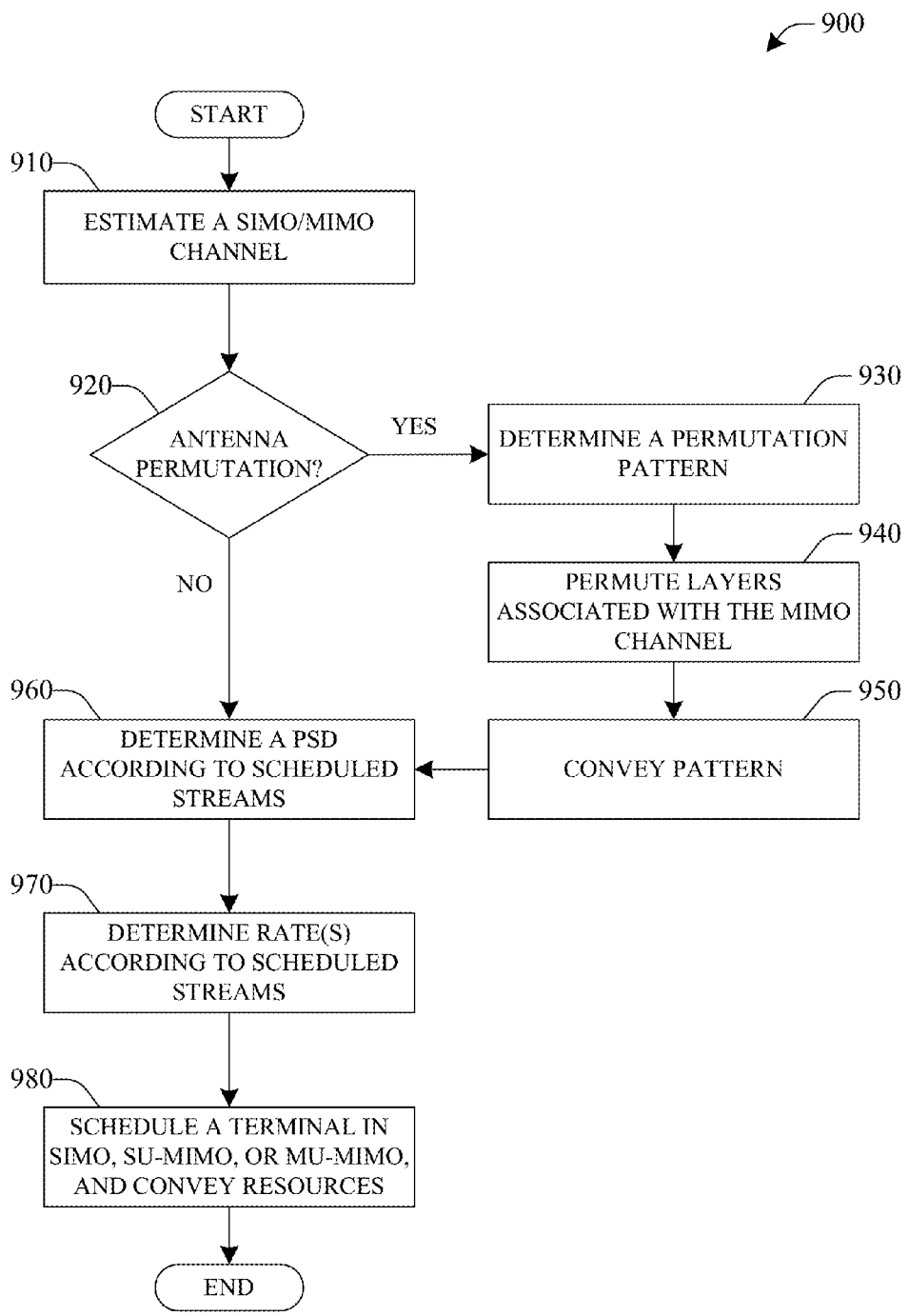
FIG. 9 presents a flowchart of a method for scheduling a SIMO, SU-MIMO, or MU-MIMO operation mode.
Figure 10:
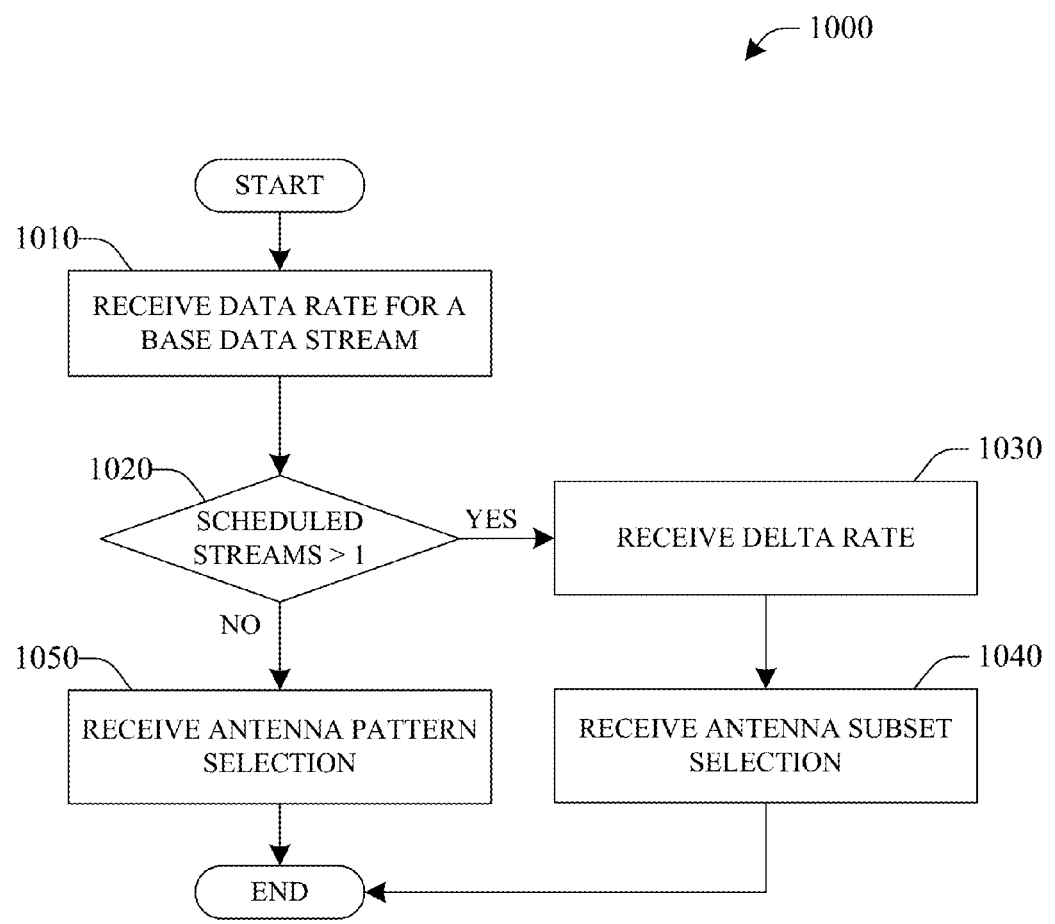
FIG. 10 presents a flowchart of a method for receiving a resource assignment for operation in SIMO, SU-MIMO, or MU-MIMO mode.

In view of the example systems shown and described above, methodologies that may be implemented in accordance with the disclosed subject matter, will be better appreciated with reference to the flowcharts of FIGS. 8, 9 and 10. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 8 presents a flowchart of a method 800 for controlling power and pilot signaling for joint operation in SIMO, SU-MIMO and MU-MIMO. At 810, a channel quality indication (CQI) channel or a reference signal is transmitted from a single antenna in a set of M antennas. It should be appreciated that while CQI control channel can be employed for power control, as described in connection with FIG. 2, substantially any reference channel (signal) can be employed to that end. The M antennas allow an access terminal (e.g., 220) to communicate/operate in a service cell (e.g., 180) wherein multiple access terminals communicate with a base station in SIMO, SU-MIMO, and MU-MIMO mode (FIG. 1). In an aspect, CQI is determined from a reference signal transmitted by a serving base station and can be employed to estimate downlink channel at a time of communication, in addition to using the conveyed CQI as a parameter in a scheduling algorithm (in the serving sector) that assigns resources. At 820, a PSD offset (ΔPSD 243) is conveyed from the antenna employed to transmit CQI. Such an offset can be estimated based on the determined CQI value, as well as load indicators associated with inter-cell interference. The conveyed PSD offset can be tabulated (in dB) according to a modulation and coding scheme assigned to a reporting access terminal (e.g., access terminal 220). The PSD offset determines the power that the reporting terminal transmits data in a reverse link, as discussed in connection with FIG. 2. At 830, the number of antennas in the set of M antennas is queried. A number M>1 leads to act 840, wherein pilot signal is transmitted from each of the M antennas. In an aspect, the pilot signals can be employed to determine a communication channel (e.g., channel sounding) between a terminal performing pilot signaling and a base station receiving the reference signals.

As discussed in connection with FIG. 3B, sounding (pilot) reference signals can be transmitted periodically, either multiplexed with data in a communication or without simultaneous data transmission. The latter is relevant to resource utilization at a terminal, since batter lifetime can be reduced is channel sounding is pursued during period of OFF transmit in the terminal. However access to channel estimation can result in assignment opportunities at a serving base station that result in improved resources available to the terminal or in a newly scheduled mode of operation with increased performance (e.g., higher peak data rate, throughput, reduced interference, and so on). A result of M=1 to query 830 leads to no further action.

FIG. 9 presents a flowchart of a method 900 for scheduling a SIMO, SU-MIMO, or MU-MIMO operation mode. At act 910 a SIMO/MIMO channel is estimated. For users with a single transmit antenna (e.g., terminal 130), a SIMO channel is estimated, whereas a MIMO channel is estimated for users with multiple transmit antennas (e.g., access points $650_U$, $650_P$, and $650_S$, or terminals $170_1$-$170_6$). The estimation can be accomplished through channel sounding—conveying pilot signals, or sounding reference signals, generated in an access terminal (e.g., in pilot generation component 228) and detected and processed in a base station. As an example, a Node B (e.g., 250) estimates SIMO/MIMO from a set of pilot signals received from a set of M antennas in an access terminal (e.g., 220). Estimation of the channel provides for determining a maximum multiplexing order $N_V$, or the number of linearly-independent, orthogonal layers or data streams supported by the channel. At act 920, the presence of antenna permutation is checked. A positive check indicates that multiple users are scheduled in MU-MIMO mode, which typically requires antenna permutation, and thus at 930 a permutation pattern is determined A permutation pattern can be characterized by a unitary matrix P ($PP^+=P^+P=1_{N_V \times N_V}$) defined in the subspace of layers $N_V$ (e.g., $\overline{N_V} \times \overline{N_V}$), such that a codeword in a first layer is permuted to a second layer at each tone or subcarrier assigned for communication. In general permutations are cyclic or pseudorandom. At act 940, layers are permuted according to permutation pattern P, and P is conveyed (e.g., broadcasted to users in a service cell by a serving base station). At 960, a PSD is determined according to the number $1 \leq N_S \leq N_V$ of scheduled streams. In the case a SIMO mode is scheduled for a terminal $N_S=1$ (antenna permutation check (e.g, act 920) results in a non-valid check) and the PSD is determined by adding a reference signal power employed to determine a CQI (see method 800) and a feedback power feedback with the channel indication. In case $N_S>1$, each stream is assigned a PSD based on a differential procedure whereby a base value is added to a PSD determined for each stream (either permuted or subject to other operation). At act 970, data rate is determined based on the scheduled streams and their corresponding PSD. Alternatively, from multiple sounding RSs and FL/RL reciprocity, detection with successive interference cancellation can result in an estimation of CQI for each of the multiple pilots and from each of these values an offset PSD can be determined and added to a reference PSD; this determining PSD for each stream in the case $N_S>1$. At act 980 a terminal is scheduled in SIMO, SU-MIMO and MU-MIMO and associated resources are conveyed to the terminal Classical (e.g., round robin, fair queuing, proportional fairness, and maximum throughput scheduling) and quantum algorithms (e.g., quantum genetic algorithm) can be employed for scheduling can be utilized. It is noted, that while the methodology 900 hereinabove described is based on antenna permutation for MIMO scheduling, other types of channel adaptation/transformations such as precoding can be utilized to the accomplishment of joint scheduling in SIMO/MIMO mode.

FIG. 10 presents a flowchart of a method 1000 for receiving a resource assignment for operation in SIMO, SU-MIMO, or MU-MIMO mode. At act 1010 a data rate for a base data stream $\delta_{BASE}$ is received. Data rate is conveyed by a fixed number of bits R determined by a serving base station (e.g., 110) and conveyed in a control channel (e.g., PDCCH in LTE). In an aspect, R is consistent with the possible MCS options available for uplink communication, such availability typically is determined in a standard specification. Such a data rate is determined by the modulation and coding scheme that can be allocated to a terminal receiving the assignment. Constellation size and code rate depend on channel conditions; for instance, different MSCs such as BPSK, QPSK, 4-QAM, and 16-QAM present an increasing probability of bit error as a function of SNR while proving increasing data rate. In an aspect, receiving a data rate for a base stream ensures that terminals limited to SIMO operation, e.g., with a single transceiver antenna can operate jointly with terminals with additional antennas.

At act 1020, the number $N_S$ of scheduled data streams is checked. A positive check reveals a plurality of scheduled data streams, which indicates a MIMO operation mode. At act 1040, to operate with multiple data streams in various terminals in disparate modes of MIMO operation, a delta date rate $\Delta\delta$ is received; Q<R bits are received in the assignment. The latter offset allows differential determination of streams data rate by employing a ladder of data rates: $\delta_{J+1} = \delta_{BASE} + J \times \Delta\delta$, with J=1, . . . , $N_S$. At act 1050, an antenna subset selection is received, the assignment is conveyed with P bits and indicates the antennas to be employed in UL communication via multiple data streams. The subset of antennas can be physical or virtual. At act 1060, an antenna pattern selection is received, indicated via S bits. Such a pattern dictates electromagnetic coupling among physical or virtual antennas employed for communication.

Next, example systems that can enable aspects of the disclosed subjected matter are described in connection with FIGS. 11 and 12. Such systems can include functional blocks, which can be functional blocks that represent functions implemented by a processor or an electronic machine, software, or combination thereof (e.g., firmware).

Figure 11:
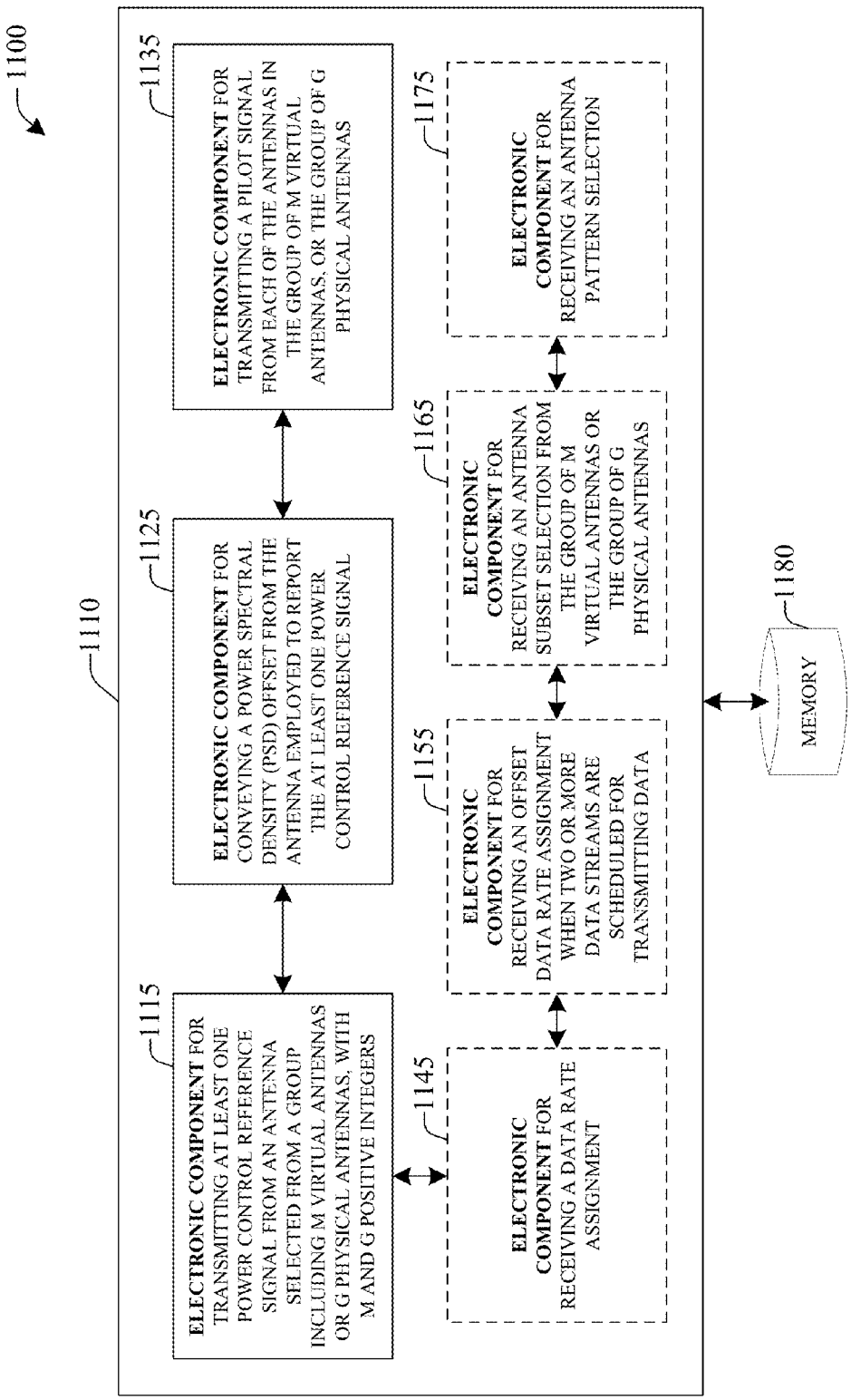
FIG. 11 illustrates a block diagram of an example system that enables controlling power and pilot signal, as well as receiving an assignment of communication resources according to aspects disclosed in the subject specification.

FIG. 11 illustrates a block diagram of an example system that enables controlling power and pilot signal, as well as receiving an assignment of communication resources according to aspects disclosed in the subject specification. System 1100 can reside, at least partially, within an access terminal (e.g., user equipment $170_1$-$170_6$, or access terminal 220). System 1100 includes a logical grouping 1110 of electronic components that can act in conjunction. In an aspect, logical grouping 1110 includes an electronic component 1115 for transmitting at least one power control reference signal from an antenna selected from a group including M virtual antennas or G physical antennas, with M and G positive integers; an electronic component 1125 for conveying a power spectral density (PSD) offset from the antenna employed to report the at least one power control reference signal; an electronic component 1135 for transmitting a pilot signal from each of the antennas in the group of M virtual antennas, or the group of G physical antennas. In addition, system 1100 can include electronic component 1145 for receiving a data rate assignment; an electronic component 1155 for receiving an offset data rate assignment when two or more data streams are scheduled for transmitting data; electronic component 1165 for receiving an antenna subset selection from the group of M virtual antennas or the group of G physical antennas; and an electronic component 1175 for receiving an antenna pattern selection.

System 1100 can also include a memory 1180 that retains instructions for executing functions associated with electrical components 1115, 1125, 1135, 1145, 1155, 1165, and 1175, as well as measured and/or computed data that may be generated during executing such functions. While shown as being external to memory 1180, it is to be understood that one or more of electronic components 1115, 1125, and 1135, 1145, 1155, 1165, and 1175 can exist within memory 1180.

Figure 12:
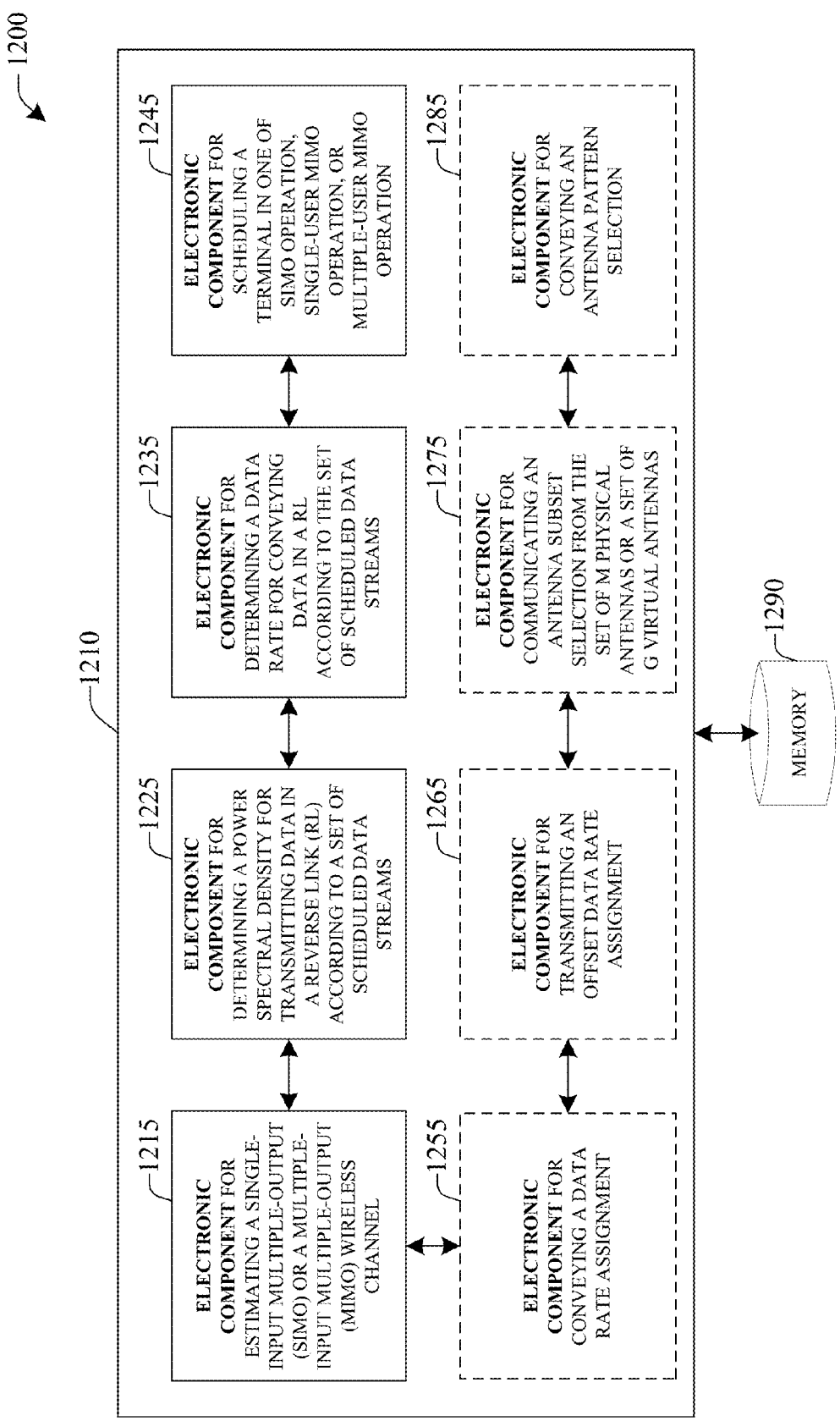
FIG. 12 is a block diagram of a system that enables scheduling a SIMO, SU-MIMO, or MU-MIMO operation modes, as well as conveying an assignment of communication resources according to aspect set forth herein.

FIG. 12 is a block diagram of a system that enables scheduling a SIMO, SU-MIMO, or MU-MIMO operation modes, as well as conveying an assignment of communication resources according to aspect set forth herein. System 1200 can reside, at least partially, within an base station (e.g., access point 110 or Node B 250). System 1200 includes a logical grouping 1210 of electronic components that can act in conjunction. In an aspect, logical grouping 1210 includes an electronic component 1215 for estimating a single-input multiple-output (SIMO) or a multiple-input multiple-output (MIMO) wireless channel; an electronic component 1225 for determining a power spectral density for transmitting data in a reverse link (RL) according to a set of scheduled data streams; an electronic component 1235 for determining a data rate for conveying data in a RL according to the set of scheduled data streams; and an electronic component 1245 for scheduling a terminal in one of SIMO operation, single-user MIMO operation, or multiple-user MIMO operation.

In addition, system 1200 can include an electronic component 1255 for conveying a data rate assignment; an electronic component 1265 for transmitting an offset data rate assignment; an electronic component 1275 for communicating an antenna subset selection from the set of M physical antennas or a set of G virtual antennas; and an electronic component 1285 for conveying an antenna pattern selection.

System 1200 can also include a memory 1290 that retains instructions for executing functions associated with electrical components 1215, 1225, 1235, 1245, 1255, 1265, 1275, and 1285, as well as measured and/or computed data that may be generated during executing such functions. While shown as being external to memory 1290, it is to be understood that one or more of electronic components 1215, 1225, 1235, 1245, 1255, 1265, 1275, and 1285 can exist within memory 1290.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method employed in wireless communication system, the method comprising:
   transmitting at least one power control reference signal from an antenna selected from a group of M antennas, with M a positive integer;
   conveying a power headroom report from the antenna employed to report the at least one power control reference signal, wherein the power headroom report is based at least in part on a reference power spectral density (PSD) level for transmitting the at least one power control reference signal, and the power headroom report adjusts the power that a base station assigns to a mobile terminal for transmitting data in a reverse link; and
   transmitting a pilot signal from each antenna in the set of M antennas for estimating a multiple-input multiple output channel when M>1, and a SIMO channel when M=1,
   wherein the power headroom report is determined based at least on a power headroom of a power amplifier in the physical antenna selected to report at least one power control reference signal.

2. The method of claim 1, the at least one power control reference signal includes a CQI channel.

3. The method of claim 1, the transmitted reference signal is at least one of a constant amplitude zero autocorrelation (CAZAC) sequence.

4. The method of claim 1, the power headroom report is estimated based at least on a load indicator associated with inter-cell interference.

5. The method of claim 1, the power headroom report is tabulated according to a modulation and coding scheme assigned to a mobile terminal.

6. The method of claim 1, further comprising determining whether to report the at least one power control reference signal from a physical antenna or a virtual antenna.

7. The method of claim 1, the group of M antennas is a set of physical antennas.

8. The method of claim 1, the group of M antennas is a set of virtual antennas.

9. The method of claim 1, the Power headroom report is determined based at least on a remaining power headroom of a power amplifier PA in a physical antenna available in the set of physical antennas combined to compose the virtual antenna employed to report the at least one power control reference signal.

10. The method of claim 1, transmitting a pilot signal includes transmitting the pilot signal periodically.

11. The method of claim 1, wherein the pilot signal is at least one of a constant amplitude zero autocorrelation (CAZAC) sequence.

12. The method of claim 1, wherein the transmitted pilot signal is at least one of a pseudorandom code, or a pseudonoise sequence.

13. The method of claim 1, wherein the transmitted pilot signal is at least one of a Gold sequence, a Walsh-Hadamard sequence, an exponential sequence, a Golomb sequence, a Rice sequence, an M-sequence, or a generalized Chirp-like (GCL) sequence.

14. A wireless communications device comprising:
   means for transmitting at least one power control reference signal from an antenna selected from a group of M antennas, with M a positive integer;
   means for conveying a power headroom report from the antenna employed to report the at least one power control reference signal, wherein the power headroom report is based at least in part on a reference power spectral density (PSD) level for transmitting the at least one power control reference signal, and the power headroom report adjusts the power that a base station assigns to a mobile terminal for transmitting data in a reverse link; and
   means for transmitting a pilot signal from each antenna in the set of M antennas for estimating a multiple-input multiple output channel when M>1, and a SIMO channel when M=1,
   wherein the power headroom report is determined based at least on a power headroom of a power amplifier in the physical antenna selected to report at least one power control reference signal.

15. A computer program product, comprising
   a non-transitory computer-readable medium including:
   code for causing at least one computer to transmit at least one power control reference signal from an antenna selected from a group of M antennas, with M a positive integer;
   code for causing the at least one computer to convey a power headroom report from the antenna employed to report the at least one power control reference signal, wherein the power headroom report is based at least in part on a reference power spectral density (PSD) level for transmitting the at least one power control reference signal, and the power headroom report adjusts the power that a base station assigns to a mobile terminal for transmitting data in a reverse link; and
   code for causing the at least one computer to transmit a pilot signal from each antenna in the set of M antennas for estimating a multiple-input multiple output channel when M>1, and a SIMO channel when M=1,
   wherein the power headroom report is determined based at least on a power headroom of a power amplifier in the physical antenna selected to report at least one power control reference signal.

16. A wireless communication device, comprising:
   a processor configured to
      transmit at least one power control reference signal from an antenna selected from a group of M antennas, with M a positive integer
      convey a power headroom report from the antenna employed to report the at least one power control reference signal, wherein the power headroom report is based at least in part on a reference power spectral density (P SD) level for transmitting the at least one power control reference signal, and the power headroom report adjusts the power that a base station assigns to a mobile terminal for transmitting data in a reverse link, and
      transmit a pilot signal from each antenna in the set of M antennas for estimating a multiple-input multiple output channel when M>1, and a SIMO channel when M=1,
      wherein the power headroom report is determined based at least on a power headroom of a power amplifier in the physical antenna selected to report at least one power control reference signal; and
   a memory coupled to the processor.

* * * * *